United States Patent Office 3,318,573
Patented May 9, 1967

3,318,573
APPARATUS FOR MAINTAINING ROTOR DISC OF GAS TURBINE ENGINE AT A LOW TEMPERATURE
Masakatsu Matsuki and Tadao Torisaki, both of Tokyo, Japan, assignors to The Director of National Aerospace Laboratory of Science and Technology Agency, Akiyoshi Matsuura, Tokyo, Japan
Filed Aug. 16, 1965, Ser. No. 479,912
Claims priority, application Japan, Aug. 19, 1964, 39/46,214
3 Claims. (Cl. 253—39.15)

This invention relates to a method and apparatus for maintaining the rotor discs of gas turbines at low temperatures.

In gas turbine engines, incoming air is compressed by an air compressor in a range of pressure ratio of from 3 to 16, and thus the compressed air may attain temperatures between about 150° C. and 400° C. The compressed air enters into a combustion chamber where fuel is added, and the mixture is burned and heated to a temperature allowable for the material constituting the turbine blades, the so heated gas driving the turbine. These high temperatures and high pressures of the gas constitute a jet stream in a jet engine to produce a thrust, whereas in power turbines, they produce a shaft power.

The efficiency of a gas turbine is greatly affected by the gas temperature and the efficiencies of the air compressor and the turbine. And, when values of the gas temperature and the above mentioned efficiencies are given, the best or highest pressure ratio producing maximum thermal efficiency is determined.

Recent significant developments in the field of the aerodynamics not only involve high efficiencies for compressors and turbines but also enable obtaining high pressure ratios, so that it would now be the most important key to improving thermal efficiencies of gas turbines by elevating gas temperatures. However, the temperatures of the gas are limited to the extent allowable for materials useable for the gas turbine blades. In other words, when the turbine blades are not cooled, the gas temperature should be approximately that allowable for the material of the blades, but when the blades are cooled, the gas temperature can be elevated to the extent that the material of the blades reaches the temperature allowable for such material. In the matter of cooling blades, problems are encountered both in working and machining blades and in obtaining the best heat resisting materials.

The investigations are parallelly developed to solve above mentioned methods, however, it is very difficult to avoid the elevation of rotor disc temperature.

On the elevation of rotor disc temperatures three points causing the elevation of rotor disc temperature, must be considered. They are as follows: first, heat is transmitted from the blades to the rotor disc; second, the rotor disc is heated by a high temperature gas coming into pocket portions formed at both lateral surfaces of the disc; and third, the rotor disc is heated by a fluid at said pocket portions of the disc, which fluid is heated by disc friction on rotation of the disc.

According to one disclosure of the prior art, the rotor disc and the blades are made hollow to be cooled by air; however, since the rotor disc and the blades are directly connected to each other, it is not only necessary to use a great deal of air for cooling, but such use will also increase the leakage loss, with the result that it tends to decrease the cycle efficiency which is to be increased by an elevated temperature of gas at the inlet of the turbine. It has also been proposed to use water for cooling instead of air. However, both modes require complicated constructions, but yet could not attain particular advantages.

Other modes and methods have been proposed, either that each blade is provided with an extended root portion which is heat resistive and prevent the rotor disc from being heated, or that cooling air is introduced into both lateral surfaces of the rotor disc to directly cool the disc. However, both the just-mentioned methods require the use of an expensive and high quality heat resistive steel for the rotor disc.

One of such prior methods is shown in British Patent No. 837,575, in which the blades are mounted on the periphery of a rotor disc, each blade comprising an extended root portion and a working portion. Cooling fluid passages are provided between adjacent blade stems; the cooling fluid passages being sealed from the working high temperature fluid passage by means of an annular member formed with axially extending fingers or fins which are disposed beneath the blade plates, the blade stems being received in notches formed in the annular member between fins. However, such fins only are not sufficient to avoid transmission of the heat from the blades to the rotor disc.

It is therefore the main object of this invention to provide an improved method of effectively preventing heat transmisison from the blades to the rotor disc by the following ararngements: first, guide plates are provided at extended root portions between the blades and the rotor disc to utilize the root portions are radiation surfaces; second, tongue elements are provided at either the upper ends of said guide plates or the blade seats to prevent high temperature gas from entering into the pocket portions surrounding the lateral surfaces of the rotor disc; and third, for overcoming the heat due to disc friction produced on rotation of the rotor disc, the fluid flow at the boundary surfaces of the rotor disc is forcedly circulated towards the guide rings provided with the space of the pocket portions. With those arrangements, the temperature of the rotor disc is maintained at a low temperature and the thermal efficiency of gas turbine is significantly high.

The above described, and other, advantages and features of the invention will be apparent from the following description read in conjunction with the accompanied drawing, in which.

Figure 1A:
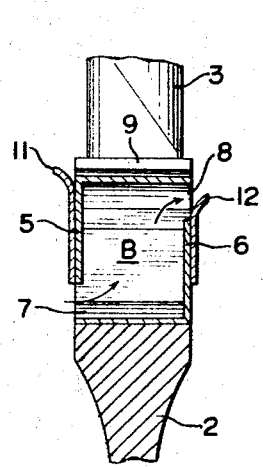
FIG. 1A shows a longitudinal sectional, partially broken away, view of an illustrative embodiment of this invention.
Figure 1B:
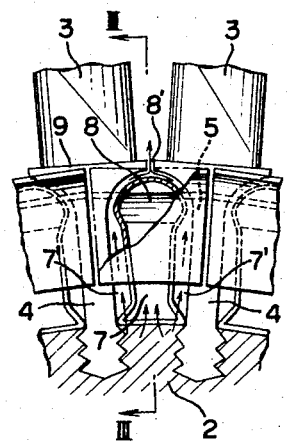
FIG. 1B shows a front view of FIG. 1A.

Referring to the drawing, 1 is a rotatable shaft, 2 is a rotor disc rotated by shaft 1. Blades 3 are mounted on the periphery of rotor disc 2, each blade comprising an extended root portion with stem 4 and working portion. In accordance with the invention, for avoiding heat transmission from blades 3 to rotor disc 2, firstly, root portions 4 are utilized as radiation surfaces and provided with guide plates 5 and 6. With this arrangement and due to the pressure difference existing before and behind the spatial regions of rotor disc 2, and the centrifugal force produced by the rotation of the rotor, a cooling air is forcedly drawn into the spatial region formed between guide plates 5 and 6 through inlet opening 7, 7' and is ejected from outlet opening 8, 8' to cool extended root portions 4 for avoiding heat transmission to rotor disc 2. This position of opening 7 is nearer in the radial direction to the disc than the position of opening 8. Fluid entry opening 7' is formed by the sides of adjacent blade stems 4 and a hollow channel-forming member B provided between the guide plates 5, 6. Member B divides the space between the adjacent blade stems 4 into inner and outer channels, the cooling fluid entering opening 7 being directed through the inner channel to exit opening 8, while the cooling fluid entering openings 7' is directed through the outer channel to exit opening 8 and a second opening 8' provided between adjacent blades of the rotor.

Figure 2:
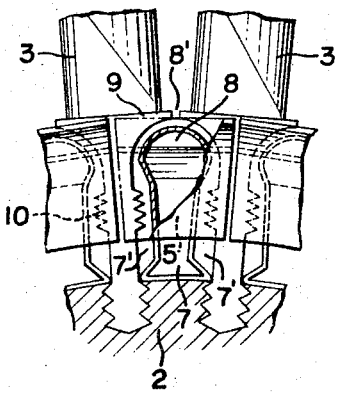
FIG. 2 shows a front view of a modification of FIG. 1.

If the surface area of extended root portions 4 is not adequately sufficient for cooling purpose, cooling fins 10 as shown in FIG. 2 may be additionally provided.

Figure 1C:
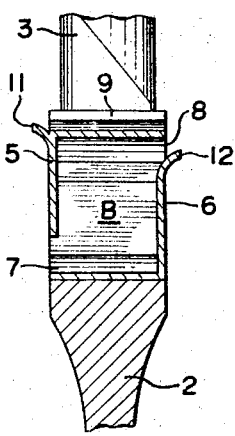
FIG. 1C shows a modification of guide plates.

It is to be noted that guide plates 5 and 6 are either integrally formed (FIG. 1C) with, or connected (FIG. 1A) to, guide plate 9 and they are constructed to be strong enough to withstand the centrifugal force developed on rotation of the rotor.

Figure 3:
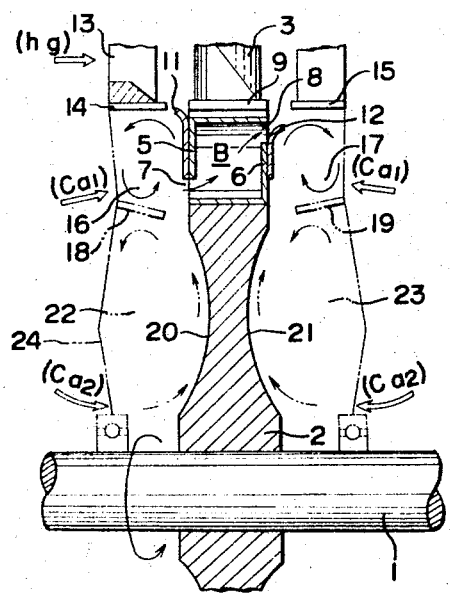
FIG. 3 is a side view of the gas turbine embodying the invention and taken along the III—III of FIG. 1B.

Secondly, to prevent the high temperature gas ($hg$) outgoing from nozzles 13 (FIG. 3) from entering into pocket portions 16 and 17, tongue elements 11 and 12 are provided either at the upper end portions of guide plates 5 and 6, respectively, or at the guide plate 9. With the provision of tongue elements 11 and 12, air flows along both lateral surfaces of rotor disc 2 toward inner peripheral rings 14 and 15 for nozzles 13 (FIG. 3) to prevent high temperature gas from entering into pocket portions 16 and 17. If necessary, cooling air $ca_1$ may be used for cooling purpose, but, cooling air $ca_2$ from pocket portions 22 and 23 at the respective lateral sides of disc 2, may also be utilized.

To avoid complicating the drawing herein, the support of the nozzle blades 13 from the engine casing wall 24 and the inner rings 14, 15 has been indicated schematically in phantom lines, it will be understood by those skilled in the art that the pocket portions 16, 17, 22, 23 referred to herein are the spaces between the rotor and the casing walls.

Thirdly, pocket portions 16, 17, 22 and 23 are heated by disc friction loss of rotor disc 2. For overcoming this heating, cooling air $ca_2$ is introduced into pocket portions 22 and 23 from, for example, the vincinity of rotatable shaft 1, as seen from FIG. 3. And further, rotor disc 2 is provided with curved or concave portions 20 and 21, and guide rings 18 and 19 are provided within pocket portions 22 and 23, whereby boundary air in the vicinity of both lateral surfaces of rotor disc 2 flows in the direction shown by the arrow-headed broken lines in FIG. 3, i.e. from the inlet along curved portions 20 and 21 and guide rings 18 and 19, into pocket portions 22 and 23.

As above described, in accordance with the invention, the turbine rotor disc is maintained at a low temperature so that it will be possible to raise the working gas temperature by the use of super heat-resisting steel, etc., for the turbine blades with the result that not only will the working efficiency of the gas turbine engine be greatly improved, but also, it will be possible to use a cheap, high tensile strength steel instead of expensive heat-resisting steel as is used for the rotor disc, since the rotor disc is maintained at a low temperature and its allowable stress is kept high. Furthermore, it may be possible to use titanium alloy for the rotor disc which enables decreasing the weight of the engine in the case of, for example, lift engines.

What is claimed is:

1. Rotor for a gas turbine engine, comprising a rotor disc mounted on a rotatable shaft, a plurality of blades mounted in spaced relation around the periphery of the disc, each blade comprising a working portion, a stem and a root portion, guide plates arranged on both sides of the rotor adjacent the stems and so positioned to leave a gap between the bottom edge of the plate and the rotor on one side and a gap between the top edge of the plate and the tops of the blade stems on the other side of the rotor to form cooling fluid entry and exit gap openings, respectively, at different radial distances from the rotor for the space formed between the guide plates, tongue elements on the guide plates extending laterally therefrom and cooperating with the inner nozzle rings of the engine, and guide rings spaced from the rotor to divide the spaces adjacent the rotor into inner and outer pocket portions for circulating cooling fluid within the outer pocket portions adjacent the guide plates, tongue elements and rings and prevent high temperature gases from entering the outer pocket portions, and circulating the cooling fluid in the inner pocket portions over the faces of the disc.

2. Rotor according to claim 1, wherein the disc is formed with concave faces to aid the circulation of the cooling fluid in the inner pocket portions.

3. Rotor according to claim 1, wherein a hollow, channel-forming member is provided between the guide plates dividing the space therebetween into inner and outer channels, the outer channel being adjacent the blade stem sides, cooling fluid entry openings for the outer channel and registering with the gap openings between the bottom edge of the guide plates and the rotor, and a cooling fluid exit opening for the outer channel intermediate the working portions of adjacent blades of the rotor, the cooling fluid entering the outer channel being ejected through the exit opening provided and the gap exit opening between the plate and tops of the stems, the cooling fluid entering the inner channel through the gap entry opening between the plates and the rotor being ejected through the exit gap opening.

References Cited by the Examiner

UNITED STATES PATENTS

| 2,603,453 | 7/1952 | Sollinger | 253—39.15 |
| 2,915,279 | 12/1959 | Chamberlin | 253—39.15 |
| 2,948,505 | 8/1960 | Sonder | 253—39.15 |

FOREIGN PATENTS

| 800,517 | 8/1958 | Great Britain. |

MARTIN P. SCHWADRON, *Primary Examiner.*

EVERETTE A. POWELL, Jr., *Examiner.*